United States Patent
Dobra et al.

(10) Patent No.: US 10,082,522 B2
(45) Date of Patent: Sep. 25, 2018

(54) TELEMATICS SYSTEM AND ASSOCIATED METHOD

(71) Applicant: Quartix Limited, Cambridge (GB)

(72) Inventors: Thomas Dobra, Royal Tunbridge Wells (GB); Jeremy Bentham, Cambridge (GB)

(73) Assignee: Quartix Limited, Cambridge (GB)

( * ) Notice: Subject to any disclaimer, the term of this patent is extended or adjusted under 35 U.S.C. 154(b) by 598 days.

(21) Appl. No.: 14/497,696

(22) Filed: Sep. 26, 2014

(65) Prior Publication Data

US 2015/0094977 A1    Apr. 2, 2015

(30) Foreign Application Priority Data

Sep. 28, 2013 (GB) .................................. 1317256.4

(51) Int. Cl.
| | | |
|---|---|---|
| *G01P 21/00* | (2006.01) | |
| *G01S 19/52* | (2010.01) | |
| *G07C 5/08* | (2006.01) | |
| *G01P 15/00* | (2006.01) | |
| *G01S 19/40* | (2010.01) | |
| *G01C 21/16* | (2006.01) | |

(Continued)

(52) U.S. Cl.
CPC ............ *G01P 21/00* (2013.01); *G01C 21/165* (2013.01); *G01C 25/005* (2013.01); *G01P 15/00* (2013.01); *G01S 19/40* (2013.01); *G01S 19/52* (2013.01); *G07C 5/08* (2013.01); *G08G 1/0112* (2013.01); *G08G 1/052* (2013.01)

(58) Field of Classification Search
CPC .... G01C 21/165; G01C 21/16; G01C 25/005; G01C 25/008; G01P 15/18; H04W 4/046
USPC ........ 73/1.38; 701/1; 702/104, 141, 150, 151
See application file for complete search history.

(56) References Cited

U.S. PATENT DOCUMENTS

| | | |
|---|---|---|
| 6,421,622 B1 | 7/2002 | Horton et al. |
| 6,823,279 B1 | 11/2004 | Nadkarni et al. |

(Continued)

FOREIGN PATENT DOCUMENTS

| | | |
|---|---|---|
| GB | 2478561 A | 9/2011 |
| WO | WO 1997/024577 A2 | 7/1997 |

(Continued)

OTHER PUBLICATIONS

Search Report issued in connection with United Kingdom Patent Application No. GB1317256.4, 2 pages, United Kingdom Intellectual Property Office, dated Apr. 10, 2014.

(Continued)

*Primary Examiner* — Roy Y Yi
*Assistant Examiner* — Jeffrey Aiello
(74) *Attorney, Agent, or Firm* — Dascenzo Intellectual Property Law, P.C.

(57) ABSTRACT

Telematics system wherein a data processor is configured to: calculate a first rotation to isolate horizontal components of orientation data obtained from a three-axis accelerometer; calculate a second rotation of the orientation data dependent on acceleration data obtained from the velocity measuring device; and perform the first and second rotations on the orientation data to calibrate the orientation of the accelerometer relative to a vehicle on which the accelerometer is mounted. An associated method of calibrating the orientation of accelerometer is also provided.

29 Claims, 3 Drawing Sheets

(51) Int. Cl.
*G01C 25/00* (2006.01)
*G08G 1/01* (2006.01)
*G08G 1/052* (2006.01)

(56) References Cited

U.S. PATENT DOCUMENTS

| | | | |
|---|---|---|---|
| 7,930,148 B1 | 4/2011 | Figaro et al. | |
| 8,275,544 B1* | 9/2012 | Wells | G01C 21/165 |
| | | | 342/146 |
| 8,589,015 B2* | 11/2013 | Willis | G01C 21/165 |
| | | | 701/1 |
| 2002/0100310 A1 | 8/2002 | Begin | |
| 2002/0103610 A1* | 8/2002 | Bachmann | A61B 5/1114 |
| | | | 702/94 |
| 2010/0060604 A1* | 3/2010 | Zwart | G06F 1/1601 |
| | | | 345/173 |
| 2012/0253585 A1 | 10/2012 | Harvie | |
| 2013/0073142 A1 | 3/2013 | Hergesheimer et al. | |
| 2013/0081259 A1 | 4/2013 | Willis | |
| 2014/0278206 A1* | 9/2014 | Girod | G01C 15/00 |
| | | | 702/141 |
| 2014/0306055 A1* | 10/2014 | Brohede | F42B 15/01 |
| | | | 244/3.21 |
| 2015/0043012 A1* | 2/2015 | Rudow | G01S 17/023 |
| | | | 356/614 |
| 2015/0045059 A1* | 2/2015 | Rudow | H04W 4/04 |
| | | | 455/456.1 |
| 2015/0057028 A1* | 2/2015 | Rudow | H04W 4/028 |
| | | | 455/456.3 |

FOREIGN PATENT DOCUMENTS

| | | |
|---|---|---|
| WO | WO 2000/017607 A1 | 3/2000 |
| WO | WO 2002/018873 A2 | 3/2002 |
| WO | WO 2013/049819 A1 | 4/2013 |
| WO | WO 2014/130077 A1 | 8/2014 |
| WO | WO 2014/130078 A1 | 8/2014 |
| WO | WO 2014/177888 A1 | 11/2014 |

OTHER PUBLICATIONS

Search Report issued in connection with European Patent Application No. EP 14186140, 2 pages, European Patent Office, dated Feb. 24, 2015.

* cited by examiner

TELEMATICS SYSTEM AND ASSOCIATED METHOD

RELATED APPLICATION

The present application claims priority to United Kingdom Patent Application No. 1317256.4, filed on Sep. 28, 2013, the complete disclosure of which is incorporated herein by reference.

FIELD

The present disclosure relates to a telematics system for monitoring vehicle movement using an accelerometer and a velocity measuring device, such as a global positioning system, and an associated method for calibrating the orientation of the accelerometer relative to the vehicle.

BACKGROUND

Telematics systems are used in vehicles to determine the position and speed of a vehicle over time. Typically a global positioning system (GPS) is mounted on a vehicle to provide information about the location of the vehicle relative to geo-synchronous satellites and from this the speed and acceleration of the vehicle can be obtained from readings obtained over time. To provide more reliable acceleration information, the GPS is often used in combination with an accelerometer also mounted on the vehicle. The orientation of the accelerometer relative to the vehicle is unknown and must be derived using information from the GPS and the accelerometer. Prior art methods for calibrating the orientation of the accelerometer relative to the GPS can involve acquisition and storage of large amounts of data, so compromising processing speed unless expensive data processors are used. Other methods involve determining the orientation of the accelerometer while the vehicle is stationary which can introduce a bias and result in an inaccurate calibration, so giving incorrect information about the vehicle's speed and acceleration.

SUMMARY

Telematics systems comprise a three-axis accelerometer associated with a moving object and configured to generate orientation data, a velocity measuring device, and a data processor. The data processor is configured to calculate a first rotation to isolate horizontal components of orientation data, calculate a second rotation of the orientation data dependent on acceleration data obtained from the velocity measuring device, and perform the first and second rotations on the orientation data to calibrate the orientation of the accelerometer relative to the moving object.

Methods of calibrating the orientation of a three-axis accelerometer associated with a moving object comprise acquiring orientation data from the accelerometer, acquiring velocity data from a velocity measuring device, supplying the orientation data and velocity data to a data processor, calculating a first rotation to isolate horizontal components of the orientation data, calculating a second rotation of the orientation data dependent on acceleration data derived from the velocity data, and performing the first and second rotations on the orientation data to calibrate the orientation of the accelerometer relative to the moving object.

DESCRIPTION

In accordance with one aspect of the present disclosure, there is provided a telematics system comprising a three-axis accelerometer associated with a moving object, and configured to generate orientation data, a velocity measuring device, such as a GPS or car odometer combined with detection of the angle of a vehicle's wheels, and a data processor. The data processor is configured to calculate a first rotation to isolate horizontal components of orientation data, calculate a second rotation of the orientation data dependent on acceleration data obtained from the velocity measuring device, and perform the first and second rotations on the orientation data to calibrate the orientation of the accelerometer relative to the moving object.

Typically the accelerometer will be mounted on a vehicle also carrying the velocity measuring device. By calibrating the orientation of the accelerometer using rotations in this way, less data needs to be stored to calibrate the position of the accelerometer relative to the vehicle and the calibration can take place faster.

The first and second rotations may be combined to apply a single transformation to the orientation data, which will generally be a gravity vector.

Preferably the processor is configured to identify at least one first value representative of a first angle of orientation of the accelerometer relative to a first axis and at least one second value representative of a second angle of orientation of the accelerometer relative to a second axis, the first axis being orthogonal to the second axis, and to use the first value and the second value to calculate the first rotation. Generally the first angle will be between the gravity vector and an x-axis and the second angle is between the gravity vector and a z-axis.

Desirably the at least one first value representative of the first angle and the at least one second value representative of the second angle are trigonometric functions only. Typically cosine and sine values will be obtained for the first angle and the second angle as accelerometer data is acquired. Using trigonometric functions instead of calculating the angle itself reduces processor time required and so improves the speed at which calibration can be achieved, with typically calibration being twice as fast when using trigonometric functions as compared to calculating angles. However alternatively the first and second values may be calculated as angles or acquired from look-up tables. If angles are calculated, then more processing time is needed than when using trigonometrical functions on a comparable processor. Using look-up tables uses up memory reducing operational processor memory.

The second rotation is preferably calculated using vector and scalar products of the accelerometer data with acceleration data obtained from the velocity measuring device.

The first and second rotations may be calculated as rotational matrices to be applied to original accelerometer data.

To ensure that data is not acquired unless a journey is being undertaken, the processor may be configured to accumulate orientation data and/or velocity data when moving between 5 km/h up to 80 km/h.

If desired, the processor may accumulate data for a set period of time to smooth noisy data. Typically data will be acquired for one second, this producing sufficient data for accurate calibration of the orientation to take place, but longer or shorter periods may be desired and thus the period of data acquisition may range from 0.2 seconds to one hour.

The velocity measurement device and the accelerometer will typically generate data at different frequencies and accordingly the processor may sample the velocity measurement data and the accelerometer data at different frequencies. Thus, by way of example, the accelerometer may be sampled at 100 Hz and the GPS at 10 Hz.

The disclosure also lies in a method of calibrating the orientation of a three-axis accelerometer associated with a moving object, the method comprising acquiring orientation data, such as gravity vector data, from an accelerometer, acquiring velocity data from a velocity measuring device, such as a GPS or car odometer combined with detection of the angle of a vehicle's wheels, supplying the orientation data and velocity data to a data processor, calculating a first rotation to isolate horizontal components of the orientation data, calculating a second rotation of the orientation data dependent on acceleration data derived from the velocity data, and performing the first and second rotations on the orientation data to calibrate the orientation of the accelerometer relative to the moving object.

Typically the accelerometer is mounted on a vehicle.

The first and second rotations may be combined to apply a single transformation to the orientation data.

Desirably the method further comprises identifying at least one first value representing a first angle of orientation of the accelerometer relative to a first axis and identifying at least one second value representing a second angle of orientation of the accelerometer relative to a second axis, the first axis being orthogonal to the second axis, and using the first value and the second value to calculate the first rotation. The first angle is preferably between the gravity vector and an x-axis and the second angle is between the gravity vector and a z-axis.

Desirably the at least one first value representative of the first angle and the at least one second value representative of the second angle are obtained as trigonometric functions only. Typically cosine and sine values will be obtained for the first angle and the second angle as accelerometer data is acquired. Using trigonometric functions instead of calculating the angle itself reduces processor time required and so improves the speed at which calibration can be achieved. However alternatively the first and second values may be calculated as angles or acquired from look-up tables.

The trigonometric functions used are preferably cosines and sines and the method may further comprise calculating the sines and cosines of the angles between the orientation vector and x and z axes by normalising vector components, and calculating the first rotation as a combination of rotation by the first angle about the z-axis followed by a rotation by the second angle about the x-axis.

The second rotation is preferably calculated using vector and scalar products of the accelerometer data with the acceleration data obtained from the velocity measuring device.

The first and second rotations may be calculated as rotational matrices to be applied to the original accelerometer data.

Preferably, the orientation data and/or velocity data is accumulated when moving between 5 km/h up to 80 km/h) and data may be acquired for a set period of time ranging from 0.2 seconds to one hour, and more preferably data is acquired for 0.2 to 5 seconds.

The velocity measurement device and the accelerometer may each be sampled at a different frequency to accommodate different data generation rates of the velocity measurement device and the accelerometer.

If desired, quaternions may be used to find an average three-dimensional rotation and to apply the average rotation to the accelerometer data.

A Newton-Raphson method may be used for performing normalisation of data components.

Figure 1:
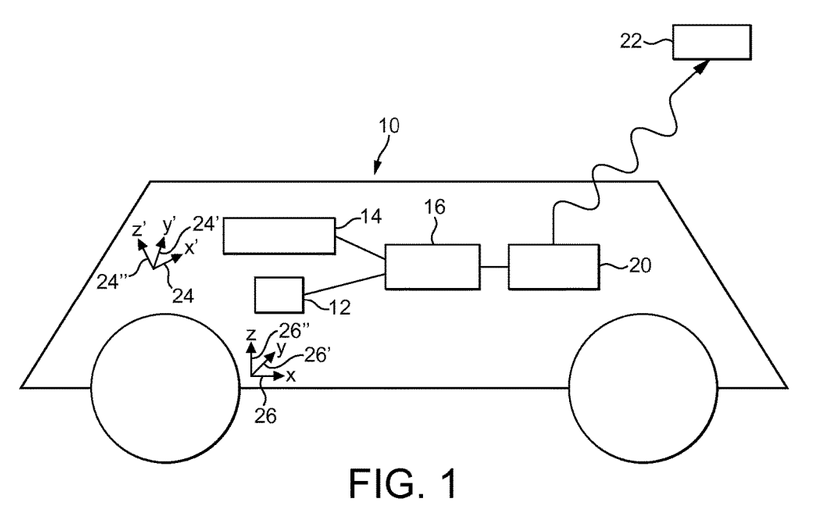
FIG. 1 is a schematic diagram of a telematics system in accordance with the present disclosure.

A vehicle 10 monitored by a telematics system is shown in FIG. 1 with a velocity measuring device 12 in the form of a GPS, and an accelerometer 14 mounted on the vehicle at different positions. GPS 12 measures the position of vehicle 10 relative to geo-synchronous satellites from which can be deduced the two-dimensional velocity of the vehicle, i.e. speed and bearing, and where required altitude. Accelerometer 14 is typically a 3-axis accelerometer measuring acceleration as a gravity vector made up of components along the x, y and z axes. Both devices 12, 14 acquire data which is passed to processor 16 for processing before being sent via modem 20 to a remote server 22. Server 22 comprises recording and processing elements which allow information about the vehicle's movements to be recorded, and/or processed, and/or monitored, and/or relayed to a third party.

A processor or a server, as used herein, may be any suitable device or devices that are configured to perform the functions discussed herein. For example, a processor or a server may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. Examples of such media include CD-ROMs, disks, hard drives, flash memory, etc. As used herein, storage, or memory, devices and media having computer-executable instructions as well as systems and methods according to the present disclosure are considered to be within the scope of subject matter deemed patentable in accordance with Section 101 of Title 35 of the United States Code.

The orientation of accelerometer 14 relative to vehicle 10 is unknown and needs to be determined if data acquired by both devices 12, 14 is to be used to provide accurate information on the vehicle acceleration. In FIG. 1, the axes of the accelerometer are shown as x-axis 24, y-axis 24', z-axis 24" with the axes of vehicle 10 being x-axis 26, y-axis 26', z-axis 26". For accelerometer 14, z-axis 24" is deemed to be the axis producing the highest readings of a gravity vector. The positive x-axis is considered as the forward direction of vehicle 10, with the x-y plane defined as the vehicle chassis. The accelerometer axes are offset from the vehicle's axes by an unknown angle.

Figure 2:
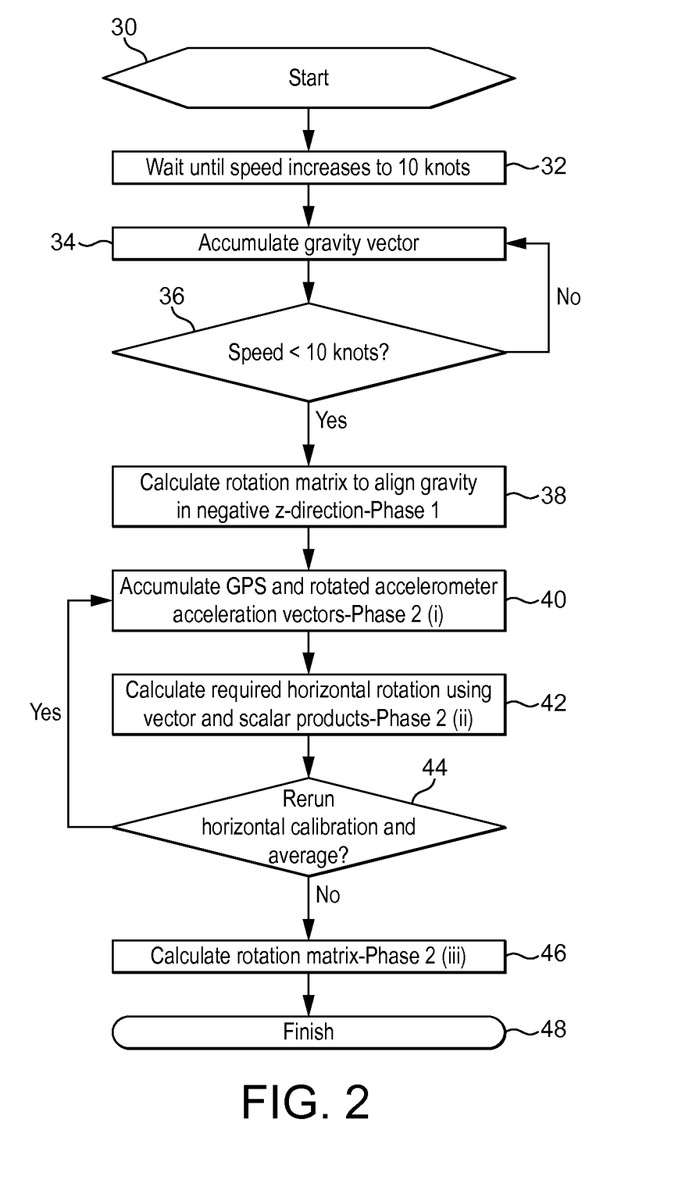
FIG. 2 is a flow chart indicating steps undertaken to calibrate an accelerometer used in the telematics system.

To calibrate the orientation of accelerometer 14 relative to vehicle 10, a calibration process as shown in outline in FIG. 2 is undertaken by processor 16. The calibration process involves using the GPS and accelerometer data to calculate rotations in the form of rotational matrices that can be applied to the unprocessed accelerometer data. Data from accelerometer 14 is firstly rotated to isolate components in a horizontal x-y plane which has an unknown alignment to the x-y plane of the vehicle chassis. A second rotation for the accelerometer data is calculated dependent on acceleration data relating to vehicle 10 and calculated from the GPS data, with the axes of the GPS acceleration data defined to be the x and y axes of vehicle 10. Applying the two rotations to the accelerometer data allows the accelerometer data to be calibrated to axes that exactly match the axes of the vehicle, so giving a true acceleration of the car in three dimensions.

The calibration of the accelerometer orientation will now be described in detail with reference to FIG. 2. The new method comprises two phases of calibration: rotating the orientation vector or gravity vector obtained from accelerometer 14 so that the gravity vector points along the down-axis (herein referred to as the negative z-axis); and rotating about a vertical or z-axis in order to produce the correct horizontal accelerations. The steps are typically performed using an algorithm.

Processor 16 is a 32-bit microprocessor with 16 KB of memory and can only support fixed point arithmetic. Processor 16 accumulates gravity vector readings from accelerometer 14 as long as vehicle 10 exceeds a certain speed and calculates a first rotation that directs each gravity vector reading in the negative z-direction. This is done by calculating a value representative of the angle that the (x, y) components of the gravity vector make with the x-axis and also a value representative of the angle that the gravity vector makes with the z-axis and combining these values to give a first rotational matrix. Processor 16 then calculates the longitudinal and lateral accelerations of vehicle 10 according to the velocity measurement from GPS 12 and calculates a second rotation required about the z-axis to match the direction of horizontal acceleration obtained from the rotated accelerometer data with the acceleration values calculated from the velocity measurements. This is done using the vector and scalar products of the two acceleration vectors obtained from GPS 12 and accelerometer 14. Finally, both first and second rotations are applied to the accelerometer data in order to rotate the original, unrotated accelerometer data to have axes corresponding to that of the vehicle's frame.

The calibration method performed by processor 16 will now be described in detail. When a vehicle ignition starts, see step 30 of FIG. 2, processor 16 monitors the speed of vehicle 10 using the GPS data and at step 34 begins to accumulate gravity vector data from accelerometer 14. Gravity vector data is only acquired once the speed of vehicle 10 first exceeds a desired speed that indicates the vehicle is likely to continue moving rather than, for example, parking. Once this speed, typically 5 km/h is reached, step 32, and until the speed first falls back below 5 km/h, step 36, the orientation data from accelerometer 14, i.e. the gravity vector data, is accumulated for a period of time, which can range from 0.2 seconds to one hour but will more usually be one second.

The rotation matrix necessary to align the gravity vector in the negative z-direction is then calculated, step 38. This is Phase 1 of the rotations needed for calibration to take place. In Phase 1, the horizontal gravity component and the vertical gravity component are calculated separately. These two components are then rotated to ensure the accelerometer data represents a gravity vector pointing downwards. To calculate the horizontal gravity component, the cosine and sine of an angle $\alpha$ between the horizontal component of the gravity vector and the x-axis are accumulated for each data reading of the gravity vector. Generally the x and y components are normalised so that there is no need to consider the magnitude of the gravity vector and the normalisation factor also outputted in the process, the normalisation factor being equal to the magnitude of the horizontal component of the gravity vector. Calculating trigonometric functions such as the sine and cosine of the angles, rather than finding the angles themselves, is quicker and makes for an easier implementation in fixed point arithmetic, which enables a cheaper processor to be used. Alternatively the angles can be obtained by using lookup tables.

Once the cosine and sine of the angle representing the horizontal gravity component have been calculated, processor 16 then calculates the cosine and sine of an angle $\beta$ between the gravity vector and the z-axis, i.e. the vertical gravity component, by normalising the horizontal gravity component with the z component of the gravity vector.

A rotation matrix is then used to invert the direction of gravity for the $\alpha$ and $\beta$ sine and cosine values. This is done by rotating by –

$$\left(\alpha - \frac{\pi}{2}\right)$$

about the z-axis, then by –

$$\left(\beta + \frac{\pi}{2}\right)$$

about the new x-axis, so giving a rotation matrix of:

$$\begin{pmatrix} 1 & 0 & 0 \\ 0 & -\sin\beta & \cos\beta \\ 0 & -\cos\beta & -\sin\beta \end{pmatrix} \begin{pmatrix} \sin\alpha & -\cos\alpha & 0 \\ \cos\alpha & \sin\alpha & 0 \\ 0 & 0 & 1 \end{pmatrix} = \begin{pmatrix} \sin\alpha & -\cos\alpha & 0 \\ -\cos\alpha\sin\beta & -\sin\alpha\sin\beta & \cos\beta \\ -\cos\alpha\cos\beta & -\sin\alpha\cos\beta & -\sin\beta \end{pmatrix}$$

Equation 1

The horizontal components of the gravity vector data have thus been identified.

The accelerometer data is then rotated as follows, where Rij are the components of the rotation matrix:

$$\begin{pmatrix} x_R \\ y_R \\ z_R \end{pmatrix} = \begin{pmatrix} R11 & R12 & R13 \\ R21 & R22 & R23 \\ R31 & R32 & R33 \end{pmatrix} \begin{pmatrix} x \\ y \\ z \end{pmatrix} = \begin{pmatrix} xR11 + yR12 + zR13 \\ zR21 + yR22 + zR23 \\ xR31 + yR32 + zR33 \end{pmatrix}$$

Equation 2

This Phase 1 rotation of step 38 ensures the gravity is set to point downwards. Calculating the composition of the horizontal $\alpha$ and vertical $\beta$ components separately, and then applying them to the data as a single rotation is quicker and so saves on processor time. The exact orientation relative to the x-y axis of vehicle 10 is still unknown.

Processor 16 then undertakes Phase 2 of the calibration. Phase 2 determines the horizontal rotation required to complete the full rotation of the accelerometer data to the vehicle's frame. It compares the accelerations derived from a two-dimensional velocity measuring device, such as GPS 12, with the x and y components of the accelerometer data that has had the Phase 1 rotation applied to it.

Generally the rotated accelerometer data and calculated accelerations will be averaged over a set period, either for a specific time or for a specific number of processing cycles dependent on the frequencies of GPS 12 and accelerometer 14 so as to allow for the accelerometer and velocity measurements to take place at different rates. This smooths noise in the sets of data.

Thus in step 40, processor 16 accumulates GPS data and rotated accelerometer vectors. Accelerations of the GPS data are calculated.

For the two-dimensional velocity data from GPS 12, the longitudinal (x, forward positive) and lateral (y, left positive) accelerations of the vehicle xAcc and yAcc are calculated as follows, where data is obtained as speed v and heading θ from a GPS, and t(n) is the time that the $n^{th}$ velocity sample [v(n), θ(n)] was taken:

$$xAcc = \frac{v(n) - v(n-1)}{t(n) - t(n-1)} \qquad \text{Equation 3}$$

$$yAcc = -v(n) \times \frac{\theta(n) - \theta(n-1)}{t(n) - t(n-1)} \qquad \text{Equation 4}$$

The minus sign in the expression for the y-acceleration indicates increasing θ corresponds to accelerating to the right.

Two values of acceleration data for GPS 12 and accelerometer 14 are acquired at each sampling point and these are accumulated for one second, subject to the speed of the vehicle being between 5 km/h and 80 km/h at the start of the one second period. This overcomes two potential problems: it smooths noisy data; and it enables the velocity measurement device to be sampled at a different frequency to the accelerometer. Often a GPS will generate data at a frequency of around 10 Hz and an accelerometer around 100 Hz.

At the end of the accumulation period, the horizontal rotation of the accelerometer data required to match the directions of the two accumulated vectors is calculated using the vector and scalar products, step 42. Where φ is the angle of said rotation about the z-axis, 'velAcceleration' is the acceleration vector of vehicle 10 and 'accelerometer' is the gravity vector from accelerometer 14 then:

|accelerometer×velAcceleration|=|accelerometer||velAcceleration|sin φ          Equation 5 accelerometer·velAcceleration=|accelerometer||velAcceleration|cos φ          Equation 6

Normalising the scalar product with the vector product produces the cosine and sine of the angle of rotation φ. By accumulating the sine and cosine of the horizontal rotation angle, rather than the angle itself, processing power is reduced as using the angle itself would generate discontinuities at 360° and require more processing power.

This calculation is repeated on sequential data readings, preferably until at least 128 values of cos φ and sin φ have been accumulated for ease of processing. With a suitable processor, the calculation could be undertaken once only, rather than being repeated for a number of times.

These accumulated values are normalised to produce estimates for cos φ and sin φ, i.e. horizontal orientation of GPS relative to horizontal (x-y) orientation of accelerometer. The required horizontal calibrations can be averaged over a series of calibration calculations, step 44. A final rotation matrix is then calculated, step 46, as follows, where Hij are the components of the rotation matrix found at the end of Phase 1:

$$\begin{pmatrix} R11 & R12 & R13 \\ R21 & R22 & R23 \\ R31 & R32 & R33 \end{pmatrix} = \qquad \text{Equation 7}$$

$$\begin{pmatrix} \cos\varphi & -\sin\varphi & 0 \\ \sin\varphi & \cos\varphi & 0 \\ 0 & 0 & 1 \end{pmatrix} \begin{pmatrix} H11 & H12 & 0 \\ H21 & H22 & H23 \\ H31 & H32 & H33 \end{pmatrix} =$$

$$\begin{pmatrix} H11\cos\varphi - H21\sin\varphi & H12\cos\varphi - H22\sin\varphi & -H23\sin\varphi \\ H11\sin\varphi + H21\cos\varphi & H12\sin\varphi + H22\cos\varphi & H23\cos\varphi \\ H31 & H32 & H33 \end{pmatrix}$$

The calibration is now complete, step 48. The original accelerometer data is rotated in the way described at Equation 2 and is now calibrated to the orientation of vehicle axes 26, 26', 26", so giving a final equation:

$$\begin{pmatrix} x_R \\ y_R \\ z_R \end{pmatrix} = \qquad \text{Equation 8}$$

$$\begin{pmatrix} B11 & B12 & B13 \\ B21 & B22 & B23 \\ B31 & B32 & B33 \end{pmatrix} \begin{pmatrix} A11 & A12 & A13 \\ A21 & A22 & A23 \\ A31 & A32 & A33 \end{pmatrix} \begin{pmatrix} x \\ y \\ z \end{pmatrix} = \begin{pmatrix} B11 & B12 & B13 \\ B21 & B22 & B23 \\ B31 & B32 & B33 \end{pmatrix} \begin{pmatrix} xA11 + yA12 + zA13 \\ xA21 + yA22 + zA23 \\ xA31 + yA32 + zA33 \end{pmatrix} =$$

$$\begin{pmatrix} (xA11 + yA12 + zA13)B11 + (xA21 + yA22 + zA23)B12 + (xA31 + yA32 + zA33)B13 \\ (xA11 + yA12 + zA13)B21 + (xA21 + yA22 + zA23)B22 + (xA31 + yA32 + zA33)B23 \\ (xA11 + yA12 + zA13)B31 + (xA21 + yA22 + zA23)B32 + (xA31 + yA32 + zA33)B33 \end{pmatrix}$$

Undertaking the above data processing steps uses approximately 1 KB of the 16 KB memory of processor 16.

When undertaking the processing steps, and when normalising the respective component of the gravity vector by calculating square roots, typically a Newton-Raphson method will be used to find the square root of x. Thus working in fixed point arithmetic, one takes a first guess $y_0$ of 2^{bit length of x}; then iterate three times using:

$$y_{n+1} = \left(y_n + \frac{x}{y_n}\right) \div 2 \qquad \text{Equation 9}$$

For accuracy, generally 4 bits to the right of the decimal point will be used when using 32-bit fixed point arithmetic. To increase processing speed, bit-shifting is used whenever multiplying or dividing by a power of 2. For the outputted sine and cosine, it is recommended to use 10-bits to the right of the decimal point.

Figure 3:
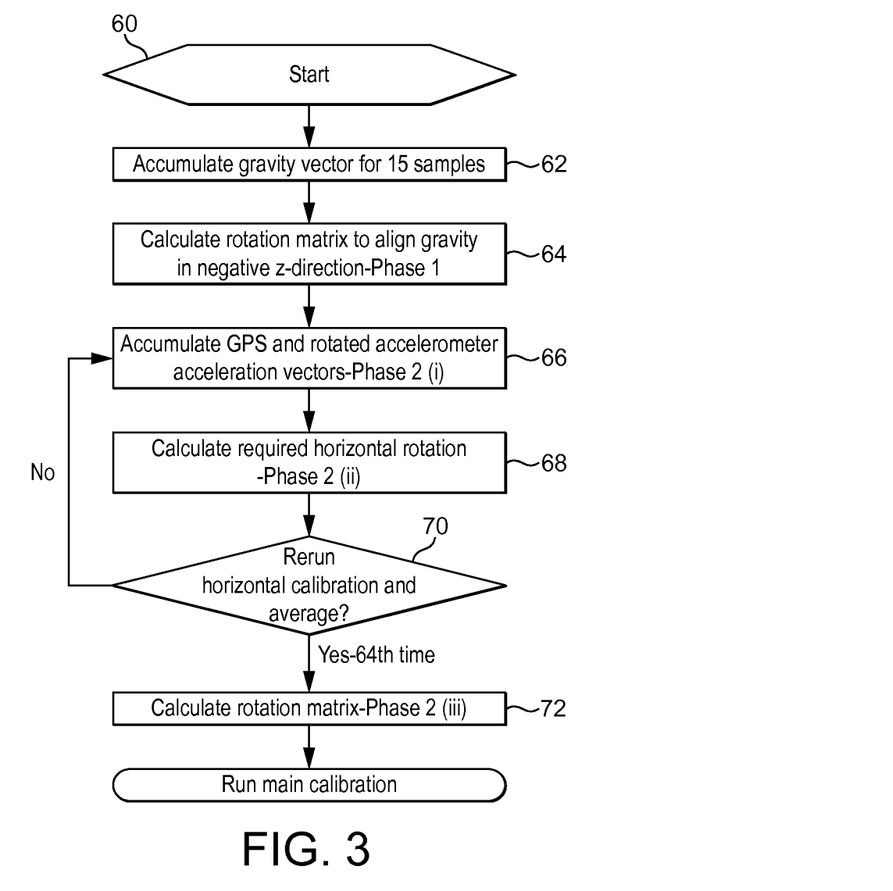
FIG. 3 is a flow chart illustrating steps undertaken to run an initial calibration.

When a telematics unit comprising GPS 12, accelerometer 14, processor 16 and modem 20 is newly installed with no prior calibrations, it is desirable to obtain results quickly with a satisfactory level of accuracy and the initial calibration is adjusted, see FIG. 3. After starting, step 60, the gravity vector is measured at rest for 15 samples initially, step 62, to complete the Phase 1 calibration, step 64. Then a Phase 2 calibration is completed as above, steps 68 to 72, except for undergoing 64 acquisitions of both cos φ and sin φ rather than 128. This allows rotated data to be outputted as soon as possible.

The gravity vector can be accumulated over subsequent calibrations, although in this case exponential forgetting is ideally used to prevent overflow in fixed point arithmetic and to place appropriate weight on more recent calibrations in case the orientation of accelerometer 14 changes relative to vehicle 10.

Instead of accumulating the gravity vector, cos φ and sin φ between successive calibrations, the rotation outputted from the method can be converted to a quaternion. These quaternions are then averaged, with or without exponential forgetting, and renormalised (since rotation quaternions have unit magnitude) to produce an output quaternion, which is to be interpreted as its corresponding rotation. The accelerometer data can then be rotated by this rotation, preferably using a rotation matrix, but any other method may be executed.

Any of the accumulating stages of Phase two can be omitted, although this is likely to produce less accurate results.

The method described above is equally applicable to other systems such as GPS navigation systems assisted by an accelerometer.

The invention claimed is:

1. A telematics system, comprising:
a vehicle;
a three-axis accelerometer mounted on the vehicle and configured to generate orientation data;
a velocity measuring device mounted on the vehicle and configured to acquire velocity data; and
a data processor mounted on the vehicle, coupled to the three-axis accelerometer to receive the orientation data, coupled to the velocity measuring device to receive the velocity data, and configured to:
responsive to the vehicle moving between 5 km/hr and 80 km/hr:
receive and accumulate, from the three-axis accelerometer, the orientation data that describes the movement of the vehicle during the moving; and
receive and accumulate, from the velocity measuring device, the velocity data that describes the movement of the vehicle during the moving;
calculate, from the orientation data that (i) describes the movement of the vehicle during the moving and (ii) was acquired from the three-axis accelerometer, a first rotation to isolate horizontal components of the orientation data;
calculate, for the orientation data acquired from the three-axis accelerometer, a second rotation dependent on acceleration data obtained from the velocity data that (i) describes the movement of the vehicle during the moving and (ii) was acquired from the velocity measuring device; and
perform the first rotation and the second rotation on the orientation data of the three-axis accelerometer to undertake calibration of an orientation of the three-axis accelerometer while the vehicle is moving relative to the vehicle.

2. The telematics system of claim 1, wherein the data processor is configured to combine the first rotation and the second rotation to apply a single transformation to the orientation data.

3. The telematics system of claim 2, wherein the data processor is configured to:
identify at least one first value representative of a first angle of the orientation of the three-axis accelerometer relative to a first axis;
identify at least one second value representative of a second angle of the orientation of the three-axis accelerometer relative to a second axis, wherein the first axis is orthogonal to the second axis; and
use the first value and the second value to calculate the first rotation.

4. The telematics system of claim 3,
wherein the first angle is between a gravity vector and an x-axis of the three-axis accelerometer; and
wherein the second angle is between the gravity vector and a z-axis of the three-axis accelerometer.

5. The telematics system of claim 3, wherein the data processor is configured to calculate the first angle and the second angle to identify the first value and the second value.

6. The telematics system of claim 3, wherein the first value and the second value are trigonometric functions only.

7. The telematics system of claim 3, wherein the data processor is configured to obtain the first angle and the second angle from look-up tables to identify the first value and the second value.

8. The telematics system of claim 1, wherein the orientation data represents a gravity vector.

9. The telematics system of claim 1, wherein the data processor is configured to calculate the second rotation using vector and scalar products of the orientation data with acceleration data associated with the velocity data received from the velocity measuring device.

10. The telematics system of claim 1, wherein the data processor is configured to calculate the first rotation and the second rotation as rotational matrices applied to the orientation data.

11. The telematics system of claim 1, wherein the data processor is configured to receive and accumulate the orientation data and the velocity data for a set period of time.

12. The telematics system of claim 1, wherein the data processor is configured to sample the velocity measuring device and the three-axis accelerometer at different frequencies.

13. The telematics system of claim 1, wherein the velocity measuring device is a GPS device.

14. A method of calibrating an orientation of a three-axis accelerometer relative to a moving object, the method comprising:
detecting when the moving object is moving between 5 km/hr and 80 km/hr
responsive to the detecting:
acquiring orientation data from the three-axis accelerometer that describes the movement of the object during the moving, wherein the three-axis accelerometer is mounted to the moving object; and
acquiring velocity data from a velocity measuring device that describes the movement of the object during the moving, wherein the velocity measuring device is mounted to the moving object;
supplying, by the three-axis accelerometer, the orientation data that describes the movement of the object during the moving to a data processor;

supplying, by the velocity measuring device, the velocity data that describes the movement of the object during the moving to the data processor;

calculating, by the data processor and from the orientation data, a first rotation to isolate horizontal components of the orientation data from the three-axis accelerometer;

calculating, by the data processor and from the orientation data, a second rotation of the orientation data from the three-axis accelerometer dependent on acceleration data derived from the velocity data of the velocity measuring device; and performing, by the data processor, the first rotation and the second rotation on the orientation data to calibrate the orientation of the three-axis accelerometer relative to the moving object.

15. The method of claim 14, further comprising:
combining, by the data processor, the first rotation and the second rotation to apply a single transformation to the orientation data.

16. The method of claim 14, wherein the orientation data represents a gravity vector.

17. The method of claim 16, further comprising:
identifying, by the data processor, at least one first value representing a first angle of the orientation of the three-axis accelerometer relative to a first axis;
identifying, by the data processor, at least one second value representing a second angle of the orientation of the three-axis accelerometer relative to a second axis, the first axis being orthogonal to the second axis; and
using, by the data processor, the first value and the second value to calculate the first rotation.

18. The method of claim 17,
wherein the first angle is between the gravity vector and an x-axis of the three-axis accelerometer; and
wherein the second angle is between the gravity vector and a z-axis of the three-axis accelerometer.

19. The method of claim 18, further comprising:
calculating, by the data processor, sines and cosines of angles between the gravity vector and an x-axis and a z-axis of the three-axis accelerometer by normalising vector components of the gravity vector; and
calculating, by the data processor the first rotation as a combination of rotation by the first angle about the z-axis followed by a rotation by the second angle about the x-axis.

20. The method of claim 17, further comprising:
calculating, by the data processor, the first angle and the second angle to provide the first value and the second value.

21. The method of claim 17, further comprising:
calculating, by the data processor, the first value and the second value as trigonometric functions only.

22. The method of claim 17, further comprising:
obtaining, by the data processor, the first angle and the second angle from look-up tables to provide the first value and the second value.

23. The method of claim 14, further comprising:
calculating, by the data processor, the second rotation using vector and scalar products of the orientation data with the acceleration data derived from the velocity data acquired by the velocity measuring device.

24. The method of claim 14, further comprising:
calculating, by the data processor, the first rotation and the second rotation as rotational matrices to be applied to the orientation data.

25. The method of claim 14, further responsive to detecting while the moving object is moving:
accumulating, by the data processor, the orientation data and the velocity data for a set period of time.

26. The method of claim 14, wherein the acquiring the orientation data and the acquiring the velocity data comprise sampling, by the data processor, the three-axis accelerometer and the velocity measurement device at different frequencies.

27. The method of claim 14, wherein the velocity measuring device is a GPS device.

28. A telematics system, comprising:
a vehicle;
a three-axis accelerometer mounted on the vehicle and configured to generate orientation data in three dimensions;
a velocity measuring device mounted on the vehicle and configured to acquire velocity data in two dimensions; and
a data processor mounted on the vehicle, coupled to the three-axis accelerometer to receive the orientation data, coupled to the velocity measuring device to receive the velocity data, and configured to:
responsive to the vehicle moving faster than a threshold speed:
receive, from the three-axis accelerometer, orientation data that describes the moving of the vehicle in three dimensions; and
receive, from the velocity measuring device, velocity data that describes the moving of the vehicle in two dimensions;
calculate, from the orientation data that describes the moving of the vehicle, a first rotation to isolate horizontal components of the orientation data;
determine, based on the velocity data that describes the moving of the vehicle, acceleration data that describes moving of the vehicle in two dimensions;
calculate a second rotation based on the acceleration data and the horizontal components of the orientation data, wherein the second rotation is a horizontal rotation that aligns the horizontal components of the orientation data with the acceleration data that describes moving of the vehicle in two dimensions; and
perform the first rotation and the second rotation on the orientation data of the three-axis accelerometer to undertake calibration of an orientation of the three-axis accelerometer while the vehicle is moving relative to the vehicle.

29. The telematics system of claim 28, wherein the orientation data and the velocity data are sampled at different frequencies.

* * * * *